Oct. 19, 1937.   O. JANZEN   2,096,518
SELF STARTING SYNCHRONOUS MOTOR OF LOW SPEED
Filed Sept. 10, 1935   2 Sheets-Sheet 2
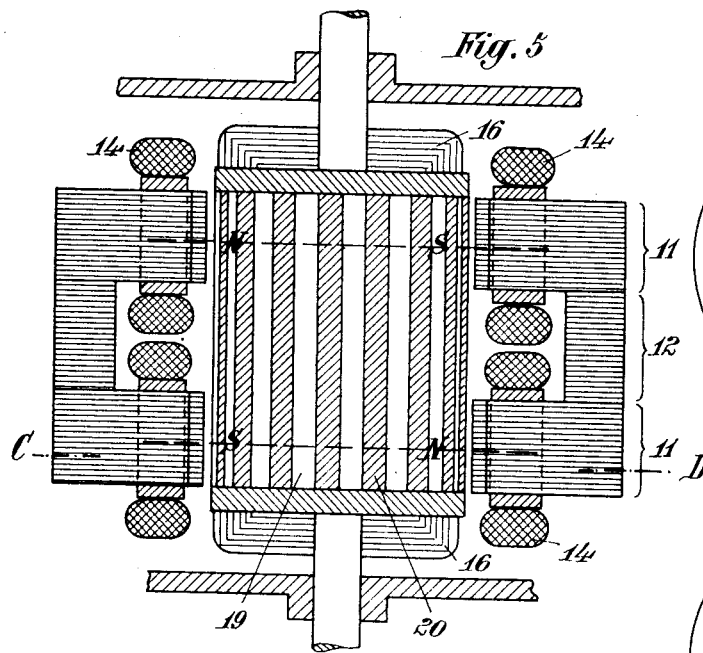
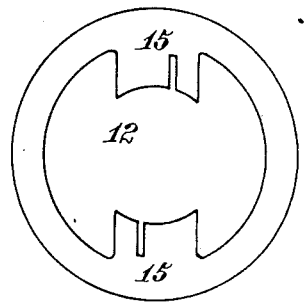
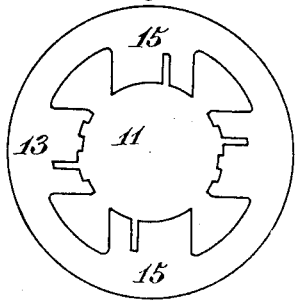
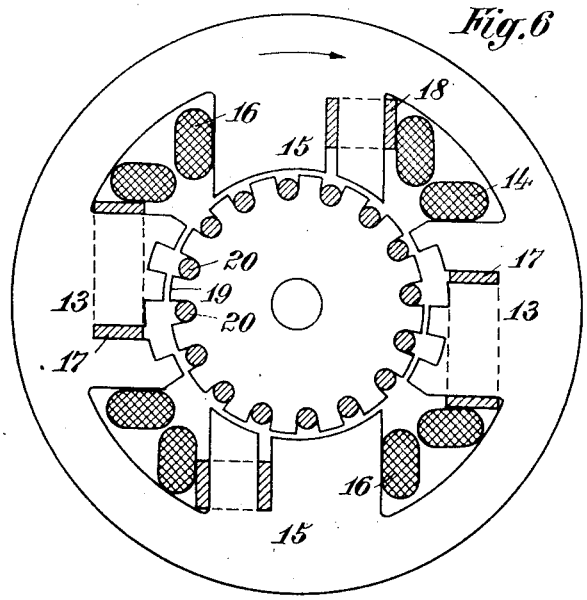
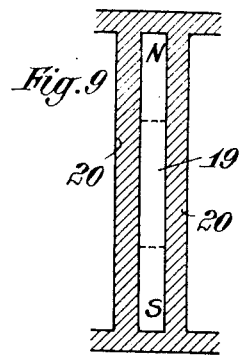
Inventor:
Otto Janzen Patented Oct. 19, 1937

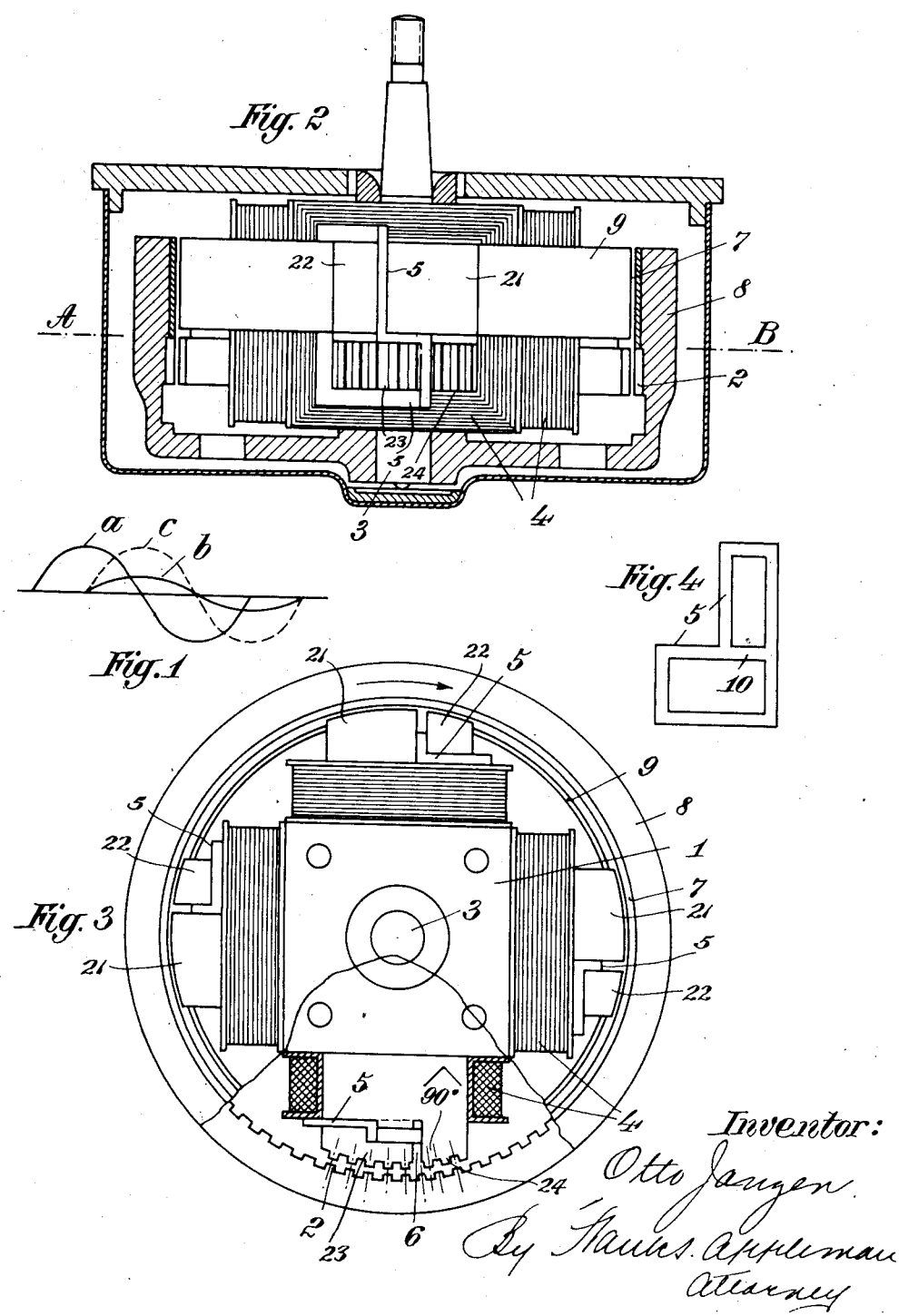

2,096,518

UNITED STATES PATENT OFFICE 2,096,518

SELF-STARTING SYNCHRONOUS MOTOR OF LOW SPEED

Otto Janzen, Berlin, Germany

Application September 10, 1935, Serial No. 39,982
In Germany September 29, 1934

9 Claims. (Cl. 172—278)

The present invention relates to an improved self-starting low speed synchronous motor for electrically driving directly apparatus to be driven at constant speed, such as, for example, talking machines or the like.

According to the present invention, this object is achieved essentially by a stator and a rotor having a synchronous and an asynchronous component, and a plurality of salient poles with shading coils on said synchronous component, said salient poles being surrounded by exciting windings, the pole teeth of each of said poles being arranged in two groups, the tooth or teeth of one group being displaced relatively to the tooth positions of the other group by one half of the rotor tooth pitch and the fluxes in the shaded and unshaded pole portions being substantially equalized by making the tooth or teeth numbers unequal and/or by unequal cross-sections of magnetic material in the said pole portions, whereby during the starting of the motor combination, no substantial retarding torque is exerted by the synchronous component, whereas during the synchronous running of the motor combination the torque of the synchronous motor at the synchronous speed is increased.

In the accompanying drawings,

Fig. 1 is a curve showing the magnetic characteristics of normal synchronous motors and motors according to the invention.

Fig. 2 is a view partly in axial section of a self-starting low speed asynchronous motor according to the invention.

Fig. 3 is a plan view of the motor shown in Fig. 2 with the casing removed and shown partly in section on the line A—B of Fig. 2.

Fig. 4 is a fragmentary view of a winding of the stator.

Fig. 5 is an axial section of a further form of rotor according to the invention.

Fig. 6 is a sectional view on the line C—D of Fig. 5.

Fig. 7 is one form and

Fig. 8 is a second form of stator laminations shown on a reduced scale.

Fig. 9 shows a pole tooth of the rotor surrounded by the cage winding.

While the magnetic characteristic of a normal synchronous motor has a substantially sinusoidal form (cf. curve $a$ of Fig. 1), and at the point where it alters its direction of curvature, due to minimum braking resistance, there is the greatest danger of the synchronous speed being exceeded by the additional asynchronous motor, an additional characteristic (curve $b$ in Fig. 1) appears, owing to the arrangement of the shaded pole teeth, these being displaced in space and therefore also phase-displaced, such characteristic being substantially weaker. By the arrangement according to the invention, of a larger number of pole-teeth in the phase-displaced group and the adjustment of the magnetic fields by suitably choosing the shading short-circuit winding, it is possible to make the phase-displaced characteristics perfectly alike (curves $a$ and $c$ of Fig. 1), so that now the synchronous motor is completely unstable during starting, and no substantial retarding torque takes place. In this case, the efficiency of the motor during its synchronous running is substantially increased owing to the fact that the torque of the motor is derived from two compensated, equal, magnetic impulses displaced with respect to time, that is, with 50-cycle alternating current, the motor receives 200 force impulses per second instead of the previous 100, which were manifested in the rotor as disturbing humming noises. As can further be seen, the torque exerted by the synchronous component near its synchronous speed is such that the accelerating asynchronous motor will have to expend a far greater force than hitherto in order to carry the synchronous part beyond the synchronous speed. The important advantage is thereby obtained that it is now possible without danger to use an asynchronous part having a relatively far greater starting force, the excess force of which can be overtaken by the synchronous part with certain and utilized as additional torque in the region of synchronous revolution whereby the efficiency may be further increased.

It has proved to be particularly advantageous if a larger number of shaded auxiliary pole teeth than the number of the unshaded main pole teeth is provided. It has been found from practical experiments that the most favourable result can most simply be obtained when the number of unshaded pole teeth bears the ratio 2:3 or 3:5 to the shaded pole teeth. Of course, these figures only indicate an approximate ratio, which may be varied in very slow or more quickly running motors. The arrangement of the two groups of pole teeth displaced with respect to one another by one-half of the rotor tooth pitch and the use of a different ratio of the pole teeth and/or different amount of iron in the two pole parts, which is generally subject to limitations, are not alone sufficient to match the magnetic fluxes exactly and so suppress the retarding torque of the synchronous motor during the starting. Therefore, according to the invention, as has already been mentioned, the final compensation is effected by correctly choosing the dimensions of the short-circuit winding. The dimensions are correctly chosen when the rotor, notwithstanding an excited stator, is substantially unstable in each position. This is achieved when the magnetic field of the two pole groups are exactly of equal strength and displaced by 90°, since only in this manner is the retarding torque of the synchronous component eliminated.

If an ammeter is then connected in the circuit of the motor, it does not show any material variation of the current absorption as the rotor slowly rotates. In the well-known synchronous motor which operates on the principle of the phonic wheel, on the contrary, the ammeter shows during the same movement a greatly varying current absorption which, as is well-known, is the result of the variable reluctance due to the variation of the teeth positions during the starting movement and simultaneously the cause of a retarding torque during starting. By means of the invention, this retarding torque is almost or entirely suppressed, and hence the acceleration of the asynchronous part is no longer impeded and, therefore, its entire torque can be used for the work of starting the apparatus to be driven.

It has already been mentioned above that the pole teeth cannot always be arranged within the groups in accordance with the most favourable ratio, without difficulty, owing to the pole division necessary for the desired speed. The smaller the number of poles in the rotor, the more difficult is it to observe this ratio. This difficulty can be obviated, for instance, with the same number of pole teeth, making the shaded and unshaded pole sections unequal in the ratio given above. Of course, it is also possible to complete the flux matching by other electrical means, such as, for instance, capacities.

Referring now to the embodiment of the invention illustrated in Figs. 2 to 4 of the drawings, the four-pole stator 1 is surrounded by an external rotor rim 2, the hub of which is fixed on the shaft 3 mounted in ball bearings. Fig. 3 shows the group division of one pole of the synchronous part, which pole is surrounded by the exciting winding 4. While the pole teeth surrounded by the short-circuit winding 5 are situated exactly opposite those of the rotor with the same pitch as the latter teeth, the unshaded auxiliary pole teeth are displaced in phase by means of the intermediate gap 6 by one-half of the tooth pitch of the rotor. In Figs. 2 and 3, 21 is the main pole of the asynchronous stator and 22 the auxiliary pole surrounded by the short-circuit winding 5. 23 and 24 denote the groups of pole teeth of the synchronous stator. The group 23 is surrounded by the short-circuit winding 5 and has a greater number of pole teeth or a greater iron cross section than the group 24. The ratio of the number of the unshaded pole teeth to the shaded pole teeth is 3:5. The synchronous part so designed forms a single unit with a magnetically separated asynchronous part arranged above it in the axial direction, so that the stator poles of both parts are surrounded by common exciting coils and their shaded portions by common short-circuit windings and the stator poles are surrounded by the copper ring 7 of the asynchronous motor element and the unwound toothed rim 2 of the synchronous motor element at the inner periphery of the common rotor spider 8. The stator of the synchronous part is provided in a manner well-known per se with magnetic shunts 9. In this arrangement with a common exciting winding for the stator poles of the synchronous and the asynchronous part, as can be seen from Fig. 2, the axial dimensions of the individual stator parts will be made to correspond to the relative outputs of the synchronous and asynchronous components.

Of course, it is also possible to provide the motor combination with a centrally arranged rotor and an external stator.

The greatest efficiency of the motor combination can, of course, be most conveniently obtained when the synchronous part and the asynchronous part carry separate windings, so that by varying the absorption of energy in the synchronous and asynchronous stator poles, the most favourable conditions can be obtained. Since the current characteristic of a synchronous motor with an unwound magnetic rotor is quite different from the current characteristic of an asynchronous motor, the best efficiency can be obtained when each of the two motors can work under conditions best suited to it. The common short-circuit winding 5, as can be seen from Fig. 4, is provided with a rib 10 situated between the individual stator poles, said rib serving as electric shunt for the different induction currents.

Although, for the above reason, the best possible efficiency is in some circumstances not obtained in the above-described motor combination employing a common exciting winding, this motor combination has such important advantages in the constructional, spatial and economical respects that, in consideration of the excellent efficiency peculiar thereto, the optimum efficiency may be disregarded.

In the arrangement described, however, it should be observed that the synchronous motor must not carry any copper on its rotor teeth, because only an unwound magnetic rotor in the synchronous part gives the required effect. Where, for other reasons, copper is nevertheless used on the rotor, according to a further feature of the invention, it must be unaffected by the synchronous magnetic flux, so that it is then possible to use the same rotor directly for the asynchronous starting, without at the same time detrimentally influencing the synchronous torque.

In Figs. 5 to 9, such a motor is illustrated by way of example, comprising a squirrel cage winding on the toothed rotor.

In this comparatively small motor, combinations of a low speed but somewhat greater in comparison with that of the motor of the first embodiment, it is possible, as will be appreciated, to provide only one rotor member collaborating with one stator carrying the synchronous and asynchronous components. In this case, however, care is taken by the arrangement and excitation of the synchronous poles, that the copper on the asynchronous rotor part is inductively of no importance to the mode of operation of the synchronous part. In view of the fact that, for the asynchronous part, it is more favourable to provide a longer rotor than for the synchronous part and about twice as much iron for the stator poles, as for the synchronous part, the arrangement of the stator is so devised that the external pole parts considered in the axial direction comprise laminations 11 according to Fig. 8 but the inner part comprises laminations 12 according to Fig. 7, in which latter the synchronous pole parts are absent, so that it is now easily possible to arrange the separate exciting windings 14 on the divided poles 13 of the synchronous part, while the poles 15 of the asynchronous motor are surrounded by their exciting windings 16. The individual poles are again divided into unequal parts, in which case, in addition to the displacement of the pole teeth by one-half of the rotor pole pitch, the ratio of the unshaded pole teeth to the shaded pole teeth surrounded by the short-circuit winding 17 is chosen as 1:2 for the stator poles of the synchronous part. 18 denotes the short-circuit windings at the asynchronous poles.

The exciting windings of the synchronous part are arranged in such a manner that the flux at one end of the rotor 19 enters its iron pole teeth opposite the stator and passes through the opposite rotor pole teeth to the opposite stator pole, while the flux at the other rotor end flows in the opposite direction whereby the polarities indicated in Figs. 5 and 9 are produced. Therefore, two equal and opposite fluxes arise in the rotor pole tooth which happens to be surrounded by the copper winding of the cage 20, so that it is quite obvious that the bifilar synchronous flux through the rotor can take place without any inductive effect on the copper. Thus, the above-mentioned condition that the synchronous rotor poles are not affected by copper is fulfilled.

I claim:—

1. A self-starting low speed synchronous motor comprising a stator and a rotor, said motor having a synchronous and an asynchronous component, the synchronous part of said stator having a plurality of toothed salient poles each having an unshaded component and a component provided with shading coils, said salient poles being surrounded by exciting windings, the teeth of each shaded component being displaced relatively to the teeth of the corresponding unshaded component a distance equal to one-half of the rotor tooth pitch and the magnetic fluxes in the shaded and unshaded portions being substantially equal, whereby during starting of the motor no substantial retarding torque is exerted by the synchronous component and during operation at synchronous speed the torque of the motor is increased.

2. A self-starting low speed synchronous motor comprising a stator and a rotor, said motor having a synchronous and an asynchronous component, the synchronous part of said stator having a plurality of toothed salient poles each having an unshaded component and a component provided with shading coils, said salient poles being surrounded by exciting windings, the teeth of each shaded component being displaced relatively to the teeth of the corresponding unshaded component a distance equal to one-half of the rotor tooth pitch and the magnetic fluxes in the shaded and unshaded portions being substantially equal, said shaded and unshaded pole components having unequal numbers of teeth to effect said equalization of the magnetic fluxes, whereby during starting of the motor no substantial retarding torque is exerted by the synchronous component and during operation at synchronous speed the torque of the motor is increased.

3. A self-starting low speed synchronous motor comprising a stator and a rotor, said motor having a synchronous and an asynchronous component, the synchronous part of said stator having a plurality of toothed salient poles each having an unshaded component and a component provided with shading coils, said salient poles being surrounded by exciting windings, the teeth of each shaded component being displaced relatively to the teeth of the corresponding unshaded component a distance equal to one-half of the rotor tooth pitch and the magnetic fluxes in the shaded and unshaded portions being substantially equal, said shaded and unshaded pole components having unequal magnetic cross-sections to effect said equalization, whereby during starting of the motor no substantial retarding torque is exerted by the synchronous component and during operation at synchronous speed the torque of the motor is increased.

4. A self-starting low speed synchronous motor comprising a stator and a rotor, said motor having a synchronous and an asynchronous component, the synchronous part of said stator having a plurality of toothed salient poles each having an unshaded component and a component provided with shading coils, said salient poles being surrounded by exciting windings, the teeth of each shaded component being displaced relatively to the teeth of the corresponding unshaded component a distance equal to one-half of the rotor tooth pitch and the magnetic fluxes in the shaded and unshaded portions being substantially equal, said shaded and unshaded pole components having unequal magnetic cross-sections and unequal numbers of teeth to effect said equalization, whereby during starting of the motor no substantial retarding torque is exerted by the synchronous component and during operation at synchronous speed the torque of the motor is increased.

5. A self-starting low speed synchronous motor comprising a stator and a rotor, said motor having a synchronous and an asynchronous component, the synchronous part of said stator having a plurality of toothed salient poles each having an unshaded component and a component provided with shading coils, said salient poles being surrounded by exciting windings, the teeth of each shaded component being displaced relatively to the teeth of the corresponding unshaded component a distance equal to one-half of the rotor tooth pitch and the magnetic fluxes in the shaded and unshaded portions being substantially equal, whereby during starting of the motor no substantial retarding torque is exerted by the synchronous component and during operation at synchronous speed the torque of the motor is increased, said exciting windings being common to both the synchronous and asynchronous components of said poles.

6. A self-starting low speed synchronous motor comprising a stator and a rotor, said motor having a synchronous and an asynchronous component, the synchronous part of said stator having a plurality of toothed salient poles each having an unshaded component and a component provided with shading coils, said salient poles being surrounded by exciting windings, the teeth of each shaded component being displaced relatively to the teeth of the corresponding unshaded component a distance equal to one-half of the rotor tooth pitch and the magnetic fluxes in the shaded and unshaded portions being substantially equal, whereby during starting of the motor no substantial retarding torque is exerted by the synchronous component and during operation at synchronous speed the torque of the motor is increased, the synchronous and asynchronous components of the stator poles having common short-circuit windings.

7. A self-starting low speed synchronous motor comprising a stator and a rotor, said motor having a synchronous and an asynchronous component, the synchronous part of said stator having a plurality of toothed salient poles each having an unshaded component and a component provided with shading coils, said salient poles being surrounded by exciting windings, the teeth of each shaded component being displaced relatively to the teeth of the corresponding unshaded component a distance equal to one-half of the rotor tooth pitch and the magnetic fluxes in the shaded and unshaded portions being substantially equal, whereby during starting of the motor no substantial retarding torque is exerted by the synchronous component and during operation at synchronous speed the torque of the motor is increased, the synchronous and asynchronous components of the stator poles having common short-circuit windings, and ribs extending between said synchronous and asynchronous components of the stator poles and connected across the common short-circuit windings for compensating induction.

8. A self-starting low speed synchronous motor comprising a stator and a rotor, said motor having a synchronous and an asynchronous component, the synchronous part of said stator having a plurality of toothed salient poles each having an unshaded component and a component provided with shading coils, said salient poles being surrounded by exciting windings, the teeth of each shaded component being displaced relatively to the teeth of the corresponding unshaded component a distance equal to one-half of the rotor tooth pitch and the magnetic fluxes in the shaded and unshaded portions being substantially equal, whereby during starting of the motor no substantial retarding torque is exerted by the synchronous component and during operation at synchronous speed the torque of the motor is increased, the rotor comprising a single body common to the synchronous and asynchronous components and having a copperless unwound magnetic portion associated with the synchronous pole teeth and a portion provided with a copper cage and associated with the asynchronous component.

9. A self-starting low speed synchronous motor comprising a stator and a rotor, said motor having a synchronous and an asynchronous component, the synchronous part of said stator having a plurality of toothed salient poles each having an unshaded component and a component provided with shading coils, said salient poles being surrounded by exciting windings, the teeth of each shaded component being displaced relatively to the teeth of the corresponding unshaded component a distance equal to one-half of the rotor tooth pitch and the magnetic fluxes in the shaded and unshaded portions being substantially equal, whereby during starting of the motor no substantial retarding torque is exerted by the synchronous component and during operation at synchronous speed the torque of the motor is increased, the rotor being a squirrel cage toothed rotor and there being synchronous stator poles at each end of the rotor whereby the magnetic flux enters the rotor at both ends in opposite directions and at equal strength.

OTTO JANZEN.